United States Patent
Miyazawa

(10) Patent No.: US 12,320,721 B2
(45) Date of Patent: Jun. 3, 2025

(54) TORQUE SENSOR

(71) Applicant: Sony Group Corporation, Tokyo (JP)

(72) Inventor: Kiyokazu Miyazawa, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 234 days.

(21) Appl. No.: 18/042,011

(22) PCT Filed: Aug. 6, 2021

(86) PCT No.: PCT/JP2021/029288
§ 371 (c)(1),
(2) Date: Feb. 17, 2023

(87) PCT Pub. No.: WO2022/044770
PCT Pub. Date: Mar. 3, 2022

(65) Prior Publication Data
US 2023/0324240 A1    Oct. 12, 2023

(30) Foreign Application Priority Data

Aug. 25, 2020   (JP) .................................. 2020-141817

(51) Int. Cl.
*G01L 3/04*   (2006.01)

(52) U.S. Cl.
CPC ...................... *G01L 3/04* (2013.01)

(58) Field of Classification Search
CPC .................................. G01L 3/04; G01L 3/109
See application file for complete search history.

(56) References Cited

U.S. PATENT DOCUMENTS

| | | | |
|---|---|---|---|
| 8,291,775 B2 * | 10/2012 | Nagasaka | G01L 3/1457 73/862.041 |
| 9,833,662 B2 | 12/2017 | Potter et al. | |
| 11,841,286 B2 * | 12/2023 | Okuma | G01L 3/1421 |
| 2021/0116315 A1 * | 4/2021 | Endo | G01L 5/0076 |
| 2021/0208014 A1 * | 7/2021 | Okuma | G01L 3/12 |

FOREIGN PATENT DOCUMENTS

JP   2009-103507 A   5/2009

OTHER PUBLICATIONS

International Search Report and Written Opinion mailed on Sep. 7, 2021, received for PCT Application PCT/JP2021/029288, filed on Aug. 6, 2021, 8 pages including English Translation.

* cited by examiner

*Primary Examiner* — Freddie Kirkland, III
(74) *Attorney, Agent, or Firm* — XSENSUS LLP

(57) ABSTRACT

A torque sensor (200) includes a sensor unit (222), a resilient body (213), and a detection unit (223). The sensor unit (222) detects, from an output unit that is a rotational body of an actuator, a rotational position in an annular first area positioned at a first distance from a rotation center, and a rotational position in an annular second area positioned at a second distance longer than the first distance from the rotation center. The resilient body (213) is provided between the first area and the second area. The detection unit (223) detects a torque applied to the output unit, on the basis of a result of the detection by the sensor unit (222).

7 Claims, 11 Drawing Sheets

TORQUE SENSOR

CROSS-REFERENCE TO RELATED APPLICATIONS

The present application is based on PCT filing PCT/JP2021/029288, filed Aug. 6, 2021, which claims priority to Japanese Application No. 2020-141817, filed Aug. 25, 2020, the entire contents of each are incorporated herein by reference.

FIELD

The present disclosure relates to a torque sensor.

BACKGROUND

With recent shrinkage in workforce, it is expected to effectively use collaborative robots that work in the same spaces as humans. The collaborative robots that work in the same spaces as the humans, not only working capacity but also safety in operation is required. For example, for the safe operation of the collaborative robots, some of the collaborative robots include torque sensors calibrated in advance for the purpose of accurate detection of an external force due to external contact, interference, or the like.

CITATION LIST

Patent Literature

Patent Literature 1: JP 2009-103507 A

SUMMARY

Technical Problem

However, the torque sensors are an expensive product, causing a problem of burden of cost when the torque sensor is mounted on the collaborative robots. For example, in a torque sensor manufacturing process, use of a strain gauge is one of the factors that make the torque sensor expensive.

Therefore, the present disclosure proposes a torque sensor that achieves cost reduction while securing torque resolution as a sensor.

Solution to Problem

To solve the above problem, A torque sensor that provides a service that requires an identity verification process according to an embodiment of the present disclosure includes: a sensor unit that detects, from an output unit that is a rotational body of an actuator, a rotational position in an annular first area positioned at a first distance from a rotation center, and a rotational position in an annular second area positioned at a second distance longer than the first distance from the rotation center; a resilient body that is provided between the first area and the second area; and a detection unit that detects a torque applied to the output unit based on a result of the detection by the sensor unit.

DESCRIPTION OF EMBODIMENTS

Figure 1:
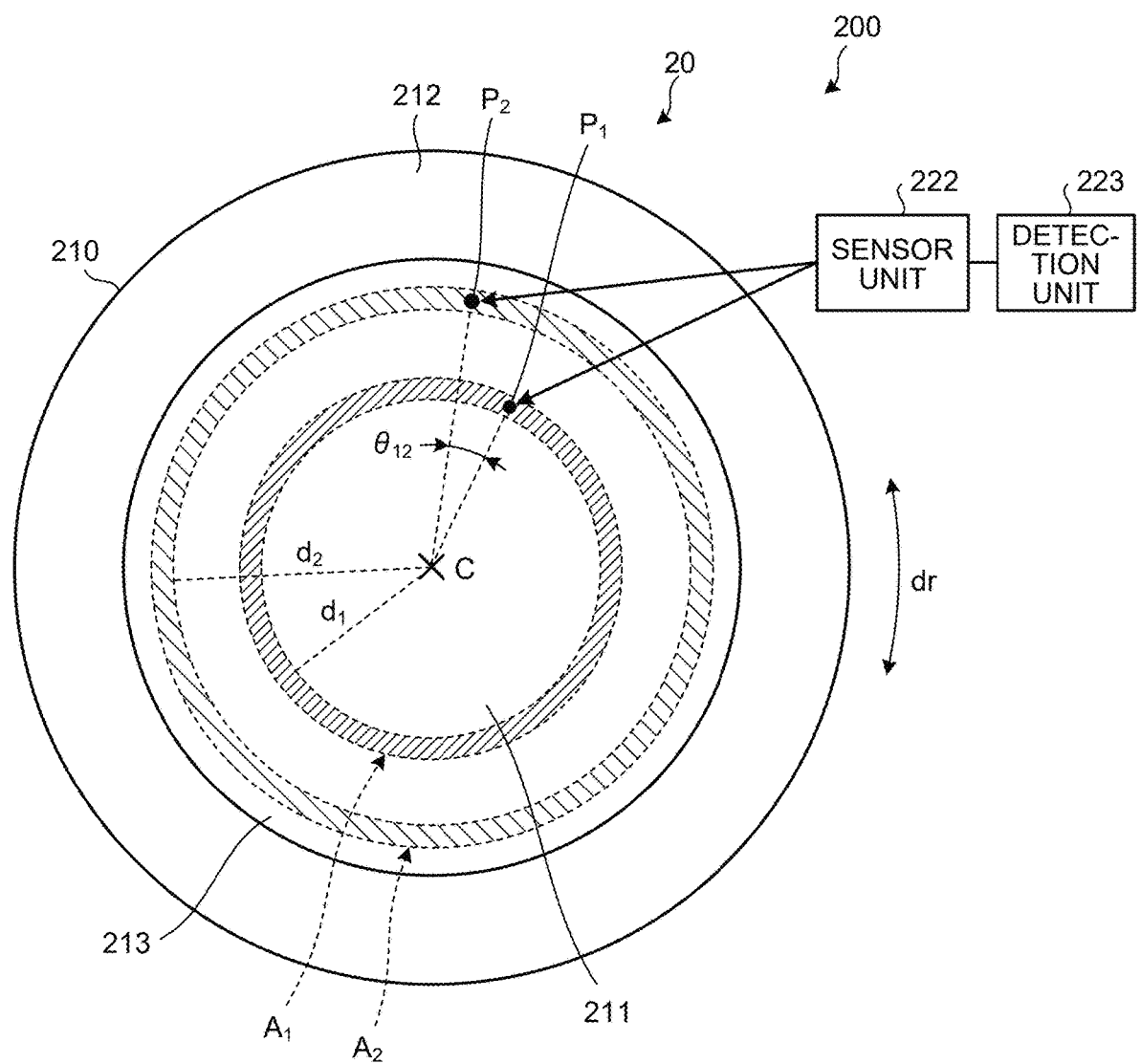
FIG. 1 is a schematic diagram illustrating an overview of a torque sensor according to the present disclosure.

The embodiments of the present disclosure will be described in detail below with reference to the drawings. Note that in the following embodiments, the same portions are denoted by the same reference numerals and symbols, and a repetitive description thereof will be omitted. Furthermore, in the present description and the drawings, a plurality of component elements having substantially the same functional configurations will be distinguished by giving the same reference numerals or symbols followed by the different numerals or symbols in some cases.

Furthermore, the present disclosure will be described in the order of items shown below.

1. Overview of technology according to present disclosure
2. Exemplary device configuration
3. Modifications
4. Conclusion

1. Overview of Technology According to Present Disclosure

An overview of a technology according to the present disclosure will be described. The present disclosure relates to a torque sensor that is mounted to an actuator.

The torque sensor according to an embodiment of the present disclosure is a so-called phase difference torque sensor. The torque sensor of the present disclosure includes a sensor unit, a resilient body, and a detection unit. The sensor unit detects, from an output unit that is a rotational body of the actuator, a rotational position in an annular first area positioned at a first distance from a rotation center, and a rotational position in an annular second area positioned at a second distance longer than the first distance from the rotation center. The resilient body is provided between the first area and the second area. The detection unit detects a torque applied to the output unit on the basis of a result of the detection by the sensor unit. An overview of the torque sensor of the present disclosure will be specifically described below with reference to FIG. 1. FIG. 1 is a schematic diagram illustrating the overview of the torque sensor according to the present disclosure.

The torque sensor 200 according to an embodiment of the present disclosure (hereinafter, referred to as "torque sensor 200" as appropriate) is connected to the output unit 20 that is the rotational body of the actuator. For example, the torque sensor 200 rotates in a circumferential direction (directions indicated by an arrow dr) around a rotation axis passing through the rotation center C in synchronization with the output unit 20 by the power of a motor of the actuator.

As illustrated in FIG. 1, the torque sensor 200 includes a flexure element 210, a sensor unit 222, and a detection unit 223. The appearance of the flexure element 210 has a perfect circular shape in plan view. The flexure element 210 includes a first output unit 211 that corresponds to an output side of the motor, a second output unit 212 that corresponds to an output side of the actuator, and a resilient portion 213 that transmits the power of the motor from the first output unit 211 to the second output unit 212.

The resilient portion 213 functions as a resilient body. The resilient portion 213 is provided at least between the annular first area $A_1$ positioned at the first distance $d_1$ (the output side of the motor) from the rotation center C of the actuator and the annular second area $A_2$ positioned at the second distance $d_2$ ($>d_1$) (the output side of the actuator) from the rotation center C. Furthermore, the sensor unit 222 detects the rotational position $P_1$ in the first area $A_1$ and the rotational position $P_2$ in the second area $A_2$, from the output unit 20 (flexure element 210). The detection unit 223 detects the torque applied to the output unit 20, on the basis of a result of the detection by the sensor unit 222. Specifically, the detection unit 223 performs calibration in advance and records an initial phase difference $\theta12$ corresponding to a difference in position generated between the rotational position $P_1$ and the rotational position $P_2$. Then, the detection unit 223 is configured to compare a difference in position generated between the rotational position $P_1$ and the rotational position $P_2$, detected when an external force applied to the output unit 20, with the initial phase difference $\theta12$, detecting the torque.

In this way, the torque sensor 200 of the present disclosure achieves cost reduction while securing the torque resolution as a sensor without using a strain gauge.

2. Exemplary Device Configuration

Figure 2:
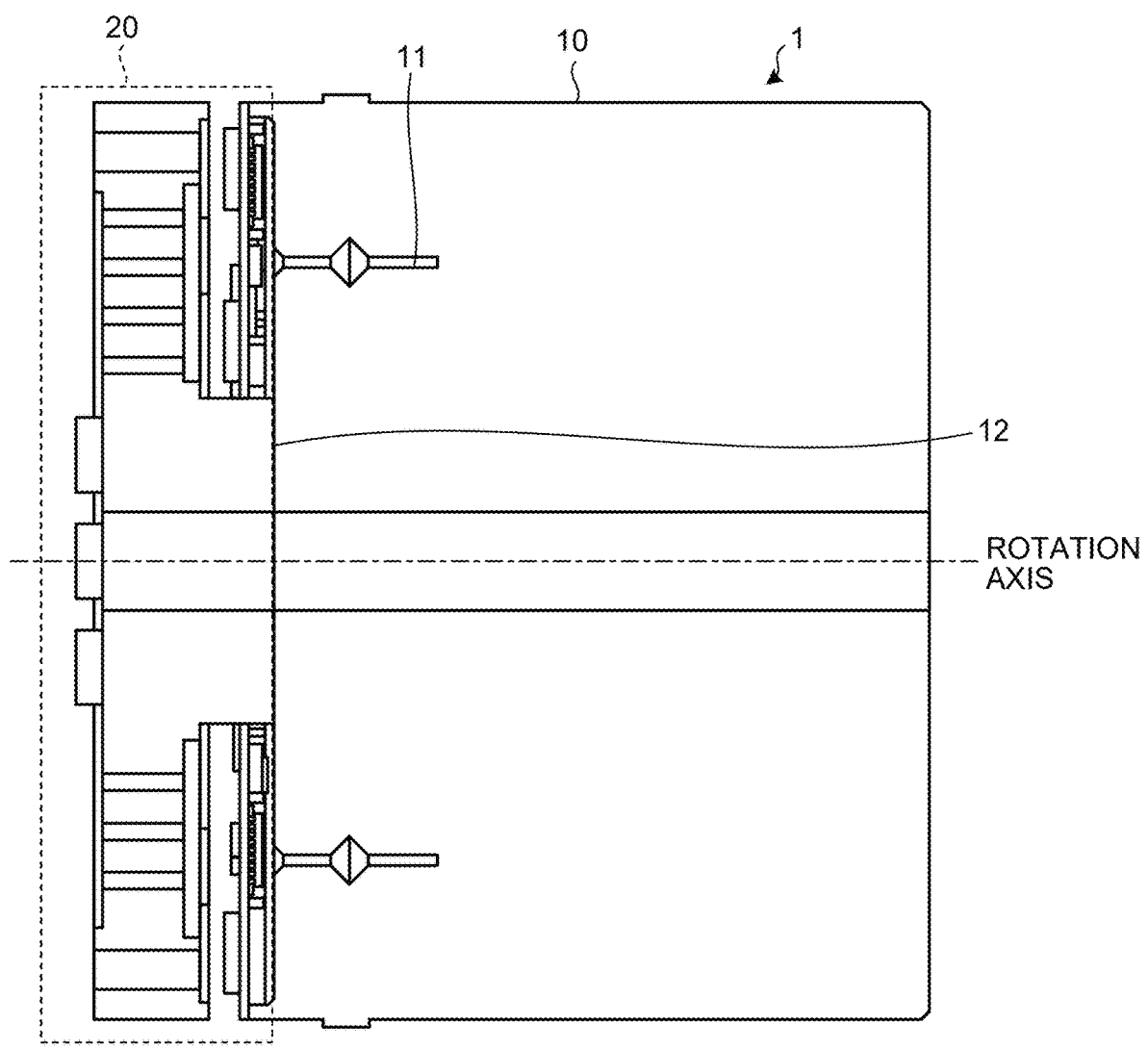
FIG. 2 is a cross-sectional view of an actuator according to an embodiment of the present disclosure.

An exemplary device configuration according to an embodiment of the present disclosure will be described. FIG. 2 is a cross-sectional view of the actuator according to the embodiment of the present disclosure. FIG. 2 illustrates a cross-section of the actuator 1 to which the torque sensor 200 according to the embodiment of the present disclosure is mounted, taken along a vertical plane, of planes including the rotation axis of the actuator 1. Furthermore, FIGS. 3 and 4 are each a perspective view, axially exploded, of respective units of the device according to an embodiment of the present disclosure.

As illustrated in FIG. 2, the actuator 1 includes a motor unit 10 and the output unit 20. The motor unit 10 includes a geared motor fixing unit 11 that fixes a geared motor that is a power source driving a rotation shaft, and a geared motor output unit 12 that outputs power generated by the geared motor.

Figure 3:
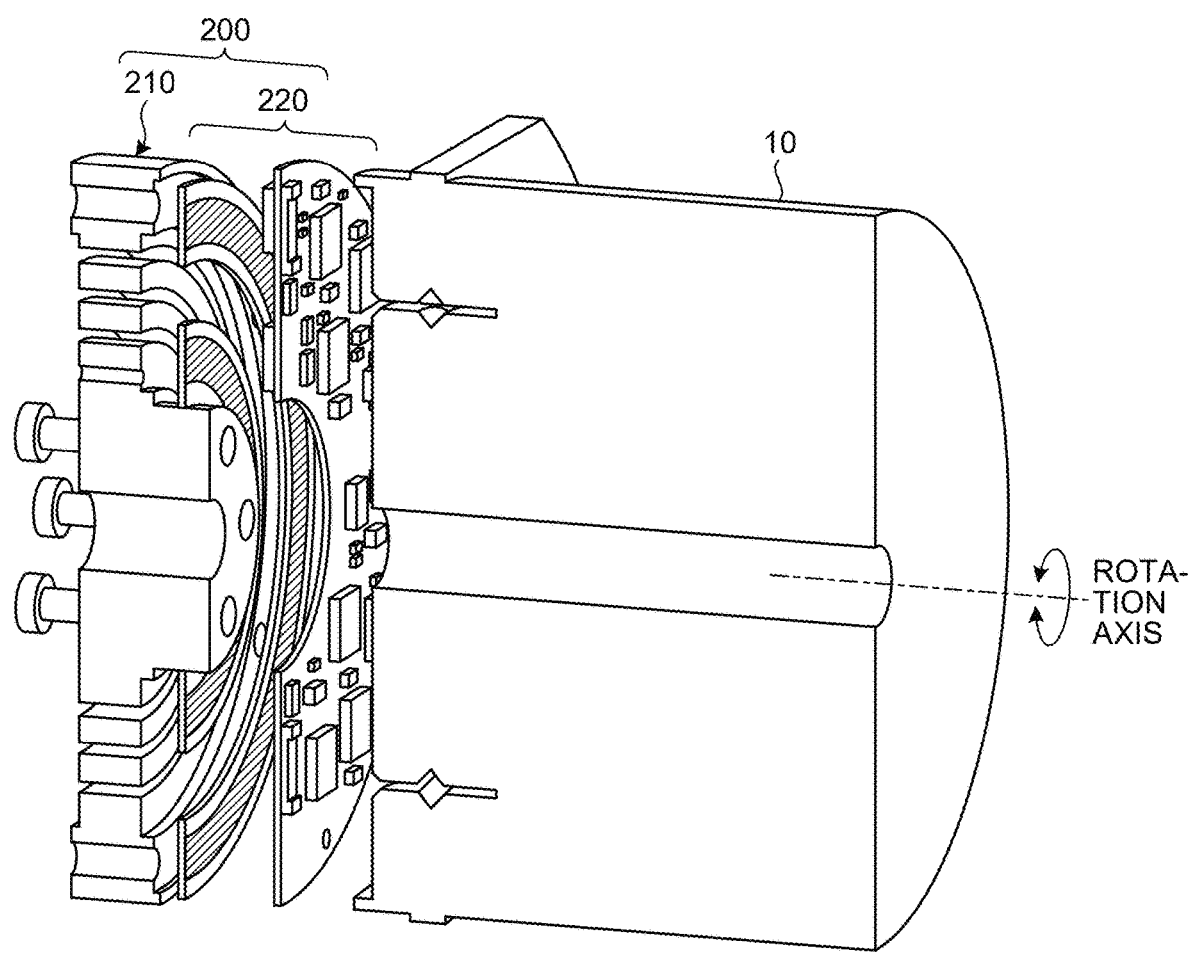
FIG. 3 is a perspective view, axially exploded, of respective units of a device according to an embodiment of the present disclosure.
Figure 4:
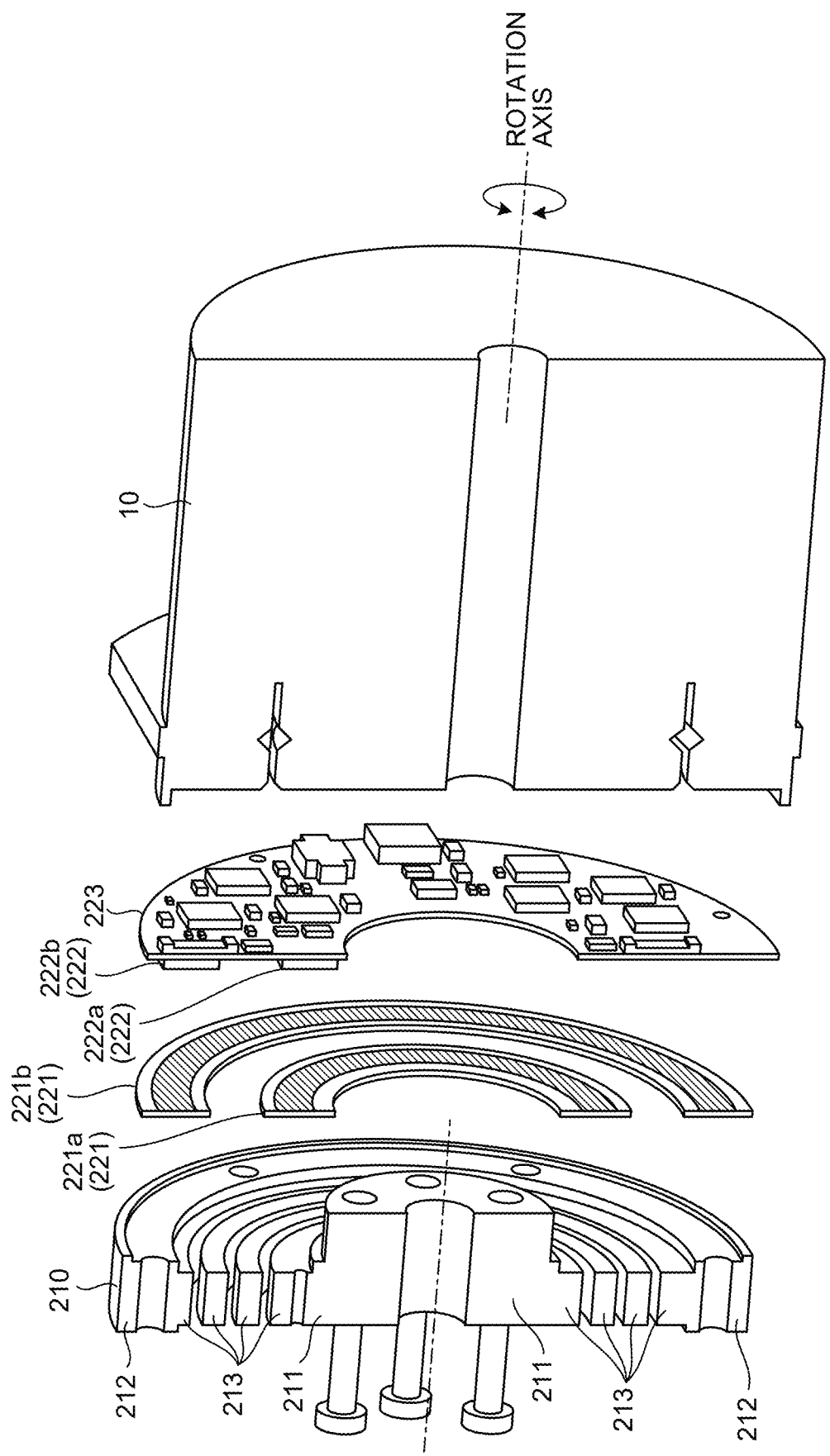
FIG. 4 is a perspective view, axially exploded, of the respective units of the device according to the embodiment of the present disclosure.

As illustrated in FIG. 3 or 4, the torque sensor 200 is connected to the output unit 20. The torque sensor 200 includes the flexure element 210 and a functional unit 220.

The flexure element 210 has a disk shape having a predetermined thickness, and includes the first output unit 211, the second output unit 212, and the resilient portion 213.

The first output unit 211 is connected to the geared motor output unit 12 of the actuator 1. The second output unit 212 corresponds to the output side of the actuator 1. For example, in a case where the actuator 1 is installed at an elbow joint portion of a collaborative robot, the second output unit 212 is connected to a member constituting a forearm.

Figure 5:
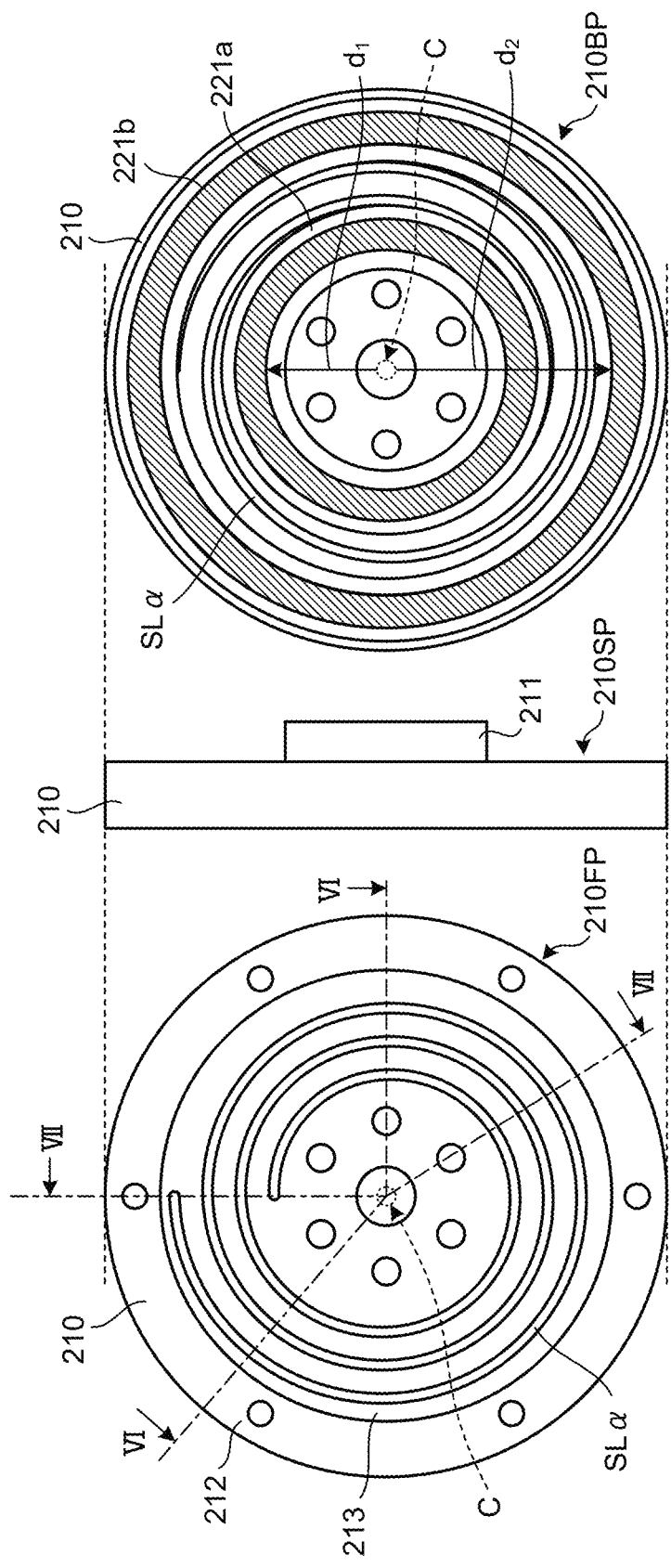
FIG. 5 is a three-view drawing of a detailed appearance configuration of a flexure element according to an embodiment of the present disclosure.
Figure 6:
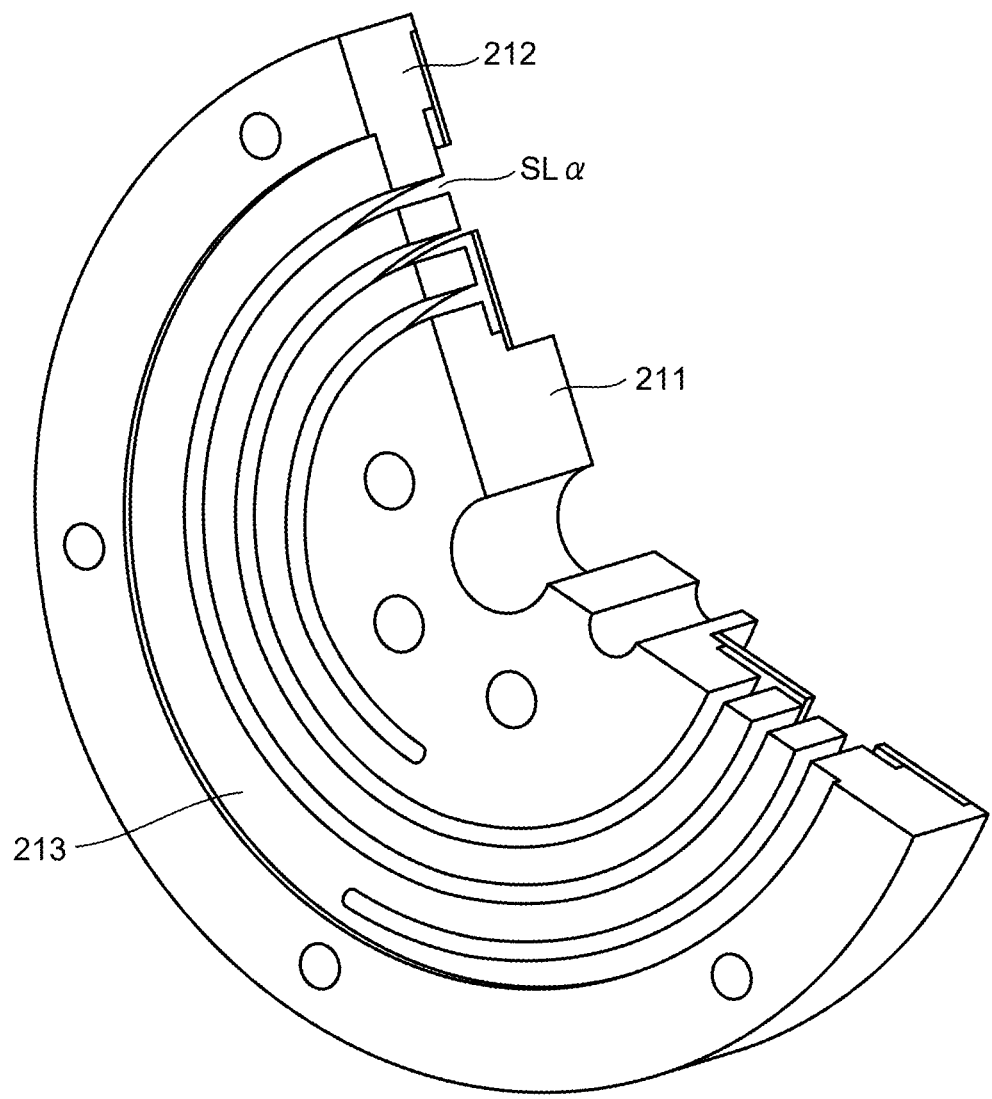
FIG. 6 is a perspective view partially illustrating a cross-section taken along line VI-VI of FIG. 5.
Figure 7:
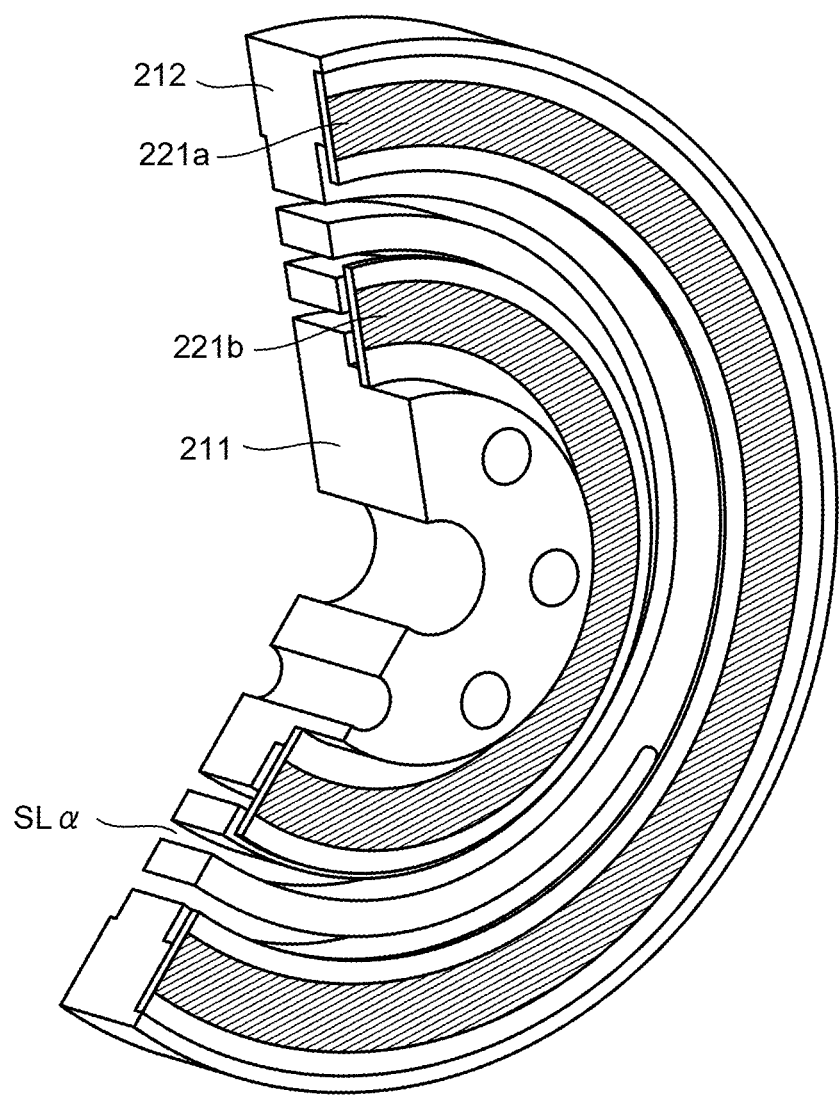
FIG. 7 is a perspective view partially illustrating a cross-section taken along line VII-VII of FIG. 5.

The resilient portion 213 transmits power of the actuator 1, from the first output unit 211 to the second output unit 212. FIG. 5 is a three-view drawing of a detailed appearance configuration of the flexure element according to an embodiment of the present disclosure. FIG. 5 illustrates a front surface 210FP, a right side surface 210SP, and a back surface 210BP of the flexure element 210 in order from the left. FIG. 6 is a perspective view partially illustrating a cross-section taken along line VI-VI of FIG. 5. FIG. 7 is a perspective view partially illustrating a cross-section taken along line VII-VII of FIG. 5.

For example, as illustrated in FIGS. 5 to 7, the resilient portion 213 includes a curved cutout portion $SL\alpha$ that extends in a circumferential direction (directions indicated by the arrow dr) about the rotation center C. The cutout portion $SL\alpha$ is formed inside the resilient portion 213 by performing laser processing spirally in a clockwise direction from the center portion of a metal disk constituting the flexure element 210, toward an outer peripheral portion thereof. Therefore, the resilient portion 213 flexibly responds to the power of the actuator 1 and the external force to the output unit 20. The flexure element 210 transmits the power of the actuator 1 from the first output unit 211 to the second output unit 212 while distorting the resilient portion 213.

In the flexure element 210, the first output unit 211 and the second output unit 212 are connected by the resilient portion 213 having the cutout portion $SL\alpha$, forming a spring having increased entire length. Accordingly, the flexure element 210 can have wide flexibility. When the resilient portion 213 having the cutout portion $SL\alpha$ is regarded as the spring, a spring constant thereof is expressed by, for example, the following Formula (1). In Formula (1), "E" represents a modulus of direct elasticity, "b" represents a width of the spring, "t" represents a thickness of the spring, and "L" represents the entire length of the spring.

[Mathematical Formula 1]

$$K = \frac{Ebt^3}{12L} \tag{1}$$

As illustrated in FIGS. 3 to 5 or FIG. 7, the functional unit 220 of the torque sensor 200 includes an encoder disk 221, the sensor unit 222, and the detection unit 223. The encoder disk 221 includes a first encoder disk 221a that is provided at a position corresponding to the output side of the motor unit 10 of the actuator 1, and a second encoder disk 221b that is provided at a position corresponding to the output side of the actuator 1.

Each of the first encoder disk 221a and the second encoder disk 221b is installed on the back surface 210BP (surface on a side of the motor unit 10) of the flexure element 210 in the flexure element 210 (output unit 20).

The first encoder disk 221a has an inner diameter that coincides with the first distance $d_1$ from the rotation center C of the actuator 1. Therefore, when the first encoder disk 221a is installed so that the center of the first encoder disk 221a is coaxial with the rotation center C, the first encoder disk 221a is arranged at a position (the first area $A_1$) corresponding to the output side of the motor unit 10. The first encoder disk 221a is provided with a position detection pattern that can be read by a first sensor 222a. The position detection pattern provided on the first encoder disk 221a functions as a first position detection pattern that is provided in the first area $A_1$.

Furthermore, the second encoder disk 221b has an inner diameter that coincides with the second distance $d_2$ from the rotation center C of the actuator 1. Therefore, when the second encoder disk 221b is installed so that the center of the second encoder disk 221b is coaxial with the rotation center C, the second encoder disk 221b is arranged at a position (the second area $A_2$) corresponding to the output side of the actuator 1. The second encoder disk 221b is provided with a position detection pattern that can be read by a second sensor 222b. The position detection pattern provided on the second encoder disk 221b functions as a second position detection pattern that is provided in the second area $A_2$. Note that the present invention is not limited to the example of the torque sensor 200 provided with the encoder disk 221, but may use the torque sensor 200 directly provided with a position detection pattern that is configured to detect the rotational position in the first area $A_1$ and the rotational position in the second area $A_2$, on the back surface 210BP (the surface on the side of the motor unit 10) of the flexure element 210.

The sensor unit 222 is an encoder integrated circuit (IC) for position detection. The sensor unit 222 includes the first sensor 222a that is installed on the output side of the motor unit 10 (an inner peripheral side of the output unit 20) and the second sensor 222b that is installed on the output side of the actuator 1 (an outer peripheral side of the output unit 20).

The first sensor 222a reads the first encoder disk 221a (the position detection pattern) to detect the rotational position (e.g., the rotational position $P_1$) in the annular first area A positioned at the first distance $d_1$ (the output side of the motor) from the rotation center C of the actuator 1. The second sensor 222b reads the second encoder disk 221b (the position detection pattern) to detect the rotational position (e.g., the rotational position $P_2$) in the annular second area $A_2$ positioned at the second distance $d_2$ (the output side of the motor) from the rotation center C of the actuator 1. The first sensor 222a and the second sensor 222b can be achieved by using a magnetic sensor such as an anisotropic magnetoresistance sensor, an optical sensor such as an optical displacement sensor, an induction current sensor such as an eddy current displacement sensor, or the like.

The detection unit 223 is a torque detection IC that is installed on an encoder board together with an encoder IC and the like corresponding to the sensor unit 222. The detection unit 223 detects the torque applied to the output unit 20, on the basis of a result of the detection by the sensor unit 222. The torque detected by the detection unit 223 is calculated according to the following Formula (2).

$$\text{Torque} = ((\theta_2 - \theta_1) + \theta_{offset}) \times \text{Gain(CW,CCW)} \quad (2)$$

In Formula (2) described above, "$\theta_{offset}$" represents a difference between sensor values detected by the sensor unit 222 at no load (when only gravitational acceleration acts). Furthermore, in Formula (2) described above, "$\theta_1$" represents a sensor value detected by the first sensor 222a installed on the output side of the motor unit 10 (the inner peripheral side of the output unit 20). Furthermore, in Formula (2) described above, "$\theta_2$" represents a sensor value detected by the second sensor 222b installed on the output side of the actuator 1 (the outer peripheral side of the output unit 20). In addition, in the following Formula (2), "Gain CW" represents sensitivity of the flexure element 210 in a clock wise (CW) direction. In addition, in the following Formula (2), "Gain CCW" represents sensitivity of the flexure element 210 in a counter clock wise (CCW) direction. "$\theta_{offset}$," "Gain CW," and "Gain CCW" are measured in advance by performing calibration in advance.

The flexure element 210 transmits power of the actuator 1, from the first output unit 211 to the second output unit 212 while distorting the resilient portion 213. Therefore, the phase difference (shift in rotational position) occurs between the first output unit 211 and the second output unit 212. In addition, even when the output unit 20 is subjected to the external force during operation of the actuator 1, the resilient portion 213 of the flexure element 210 is distorted, causing the phase difference (shift in rotational position) between the first output unit 211 and the second output unit 212. The detection unit 223 measures the phase difference at no load while the actuator 1 is not subjected to any external force, enabling detection of the torque when the actuator 1 receives the external force. Specifically, as shown in Formula (2) described above, the torque can be calculated on the basis of "$\theta_{offset}$" corresponding to the phase difference at no load while the actuator 1 is not subjected to any external force, and "$\theta_2 - \theta_1$" corresponding to a difference between the output side of the actuator 1 (the outer peripheral side of the output unit 20) and the output side of the motor unit 10 (the inner peripheral side of the output unit 20) when the actuator 1 is subjected to the external force. Note that the detection of the position by the sensor unit 222 and the detection of the torque by the detection unit 223 may be processed by the same IC.

3. Modifications

<3-1-1. Variation (1) of Resilient Portion>

Figure 8:
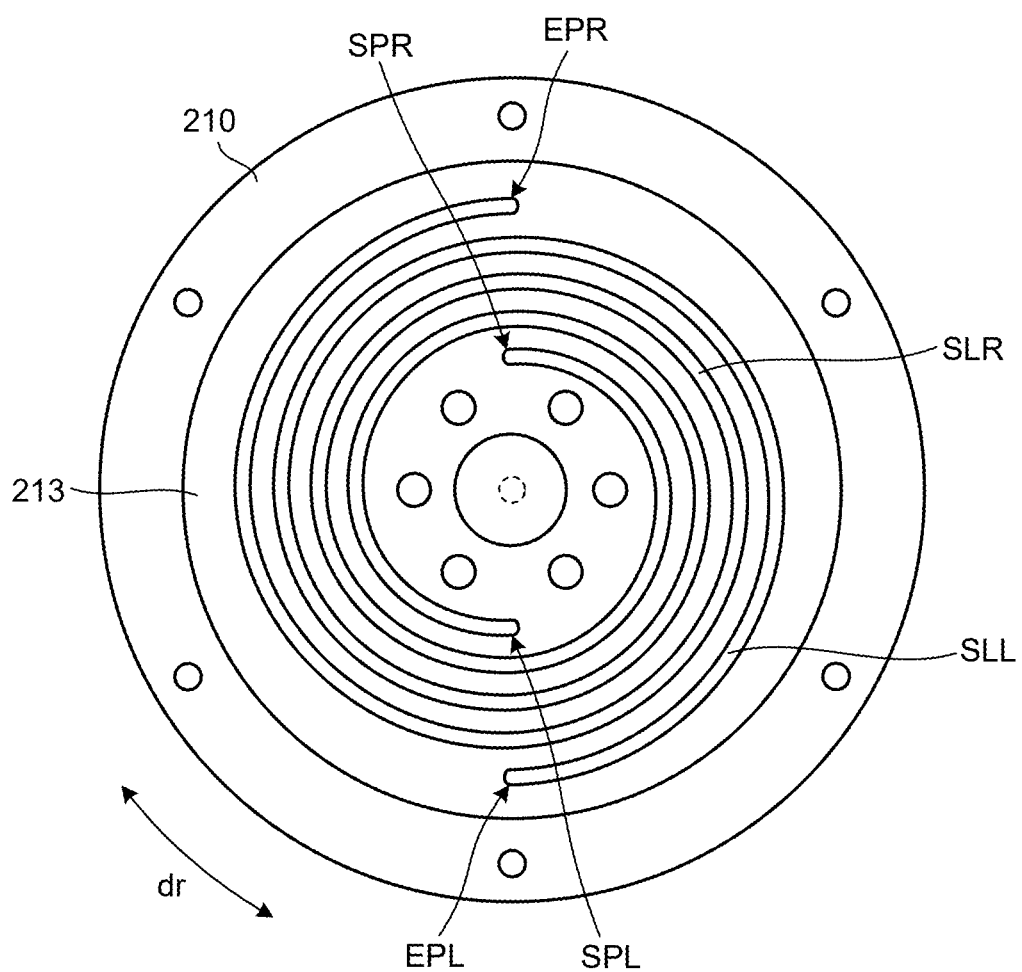
FIG. 8 is a diagram illustrating an exemplary configuration of a cutout portion according to a modification.

Another exemplary configuration of the resilient portion 213 will be described. FIG. 8 is a diagram illustrating an exemplary configuration of a cutout portion according to a modification.

In the above embodiment, the description has been given of the example in which the cutout portion SLα is provided in the resilient portion 213 by processing the metal disk constituting the flexure element 210 spirally in one stroke in the clockwise direction by laser cutting, from the center to the outer peripheral portion. This example is not particularly limited, and the resilient portion 213 may include a plurality of cutout portions having different extending directions on the basis of the rotation center C, at positions where the cutout portions do not overlap each other. For example, as illustrated in FIG. 8, the resilient portion 213 may include a cutout portion SLR and a cutout portion SLL, at positions where the cutout portions do not overlap each other. The cutout portion SLR is formed inside the resilient portion 213 by performing laser processing on the metal disk constituting the flexure element 210, spirally in a clockwise direction from a processing start point SPR to a processing end point EPR, from the center portion toward the outer peripheral portion of the disk. Furthermore, the cutout portion SLL is formed inside the resilient portion 213 by performing laser processing on the metal disk constituting the flexure element 210, spirally in a clockwise direction from a processing start point SPL to a processing end point EPL, from the center portion toward the outer peripheral portion of the disk.

Note that the present invention is not limited to the example in which the cutout portion SLR in the clockwise direction and the cutout portion SLL in the counterclockwise direction are processed into one disk to form the flexure element 210. For example, the flexure element 210 may be configured by axially superimposing a disk having the cutout portion SLR in the clockwise direction and a disk having the cutout portion SLL in the counterclockwise direction.

<3-1-2. Variation (2) of Resilient Portion>

Figure 9:
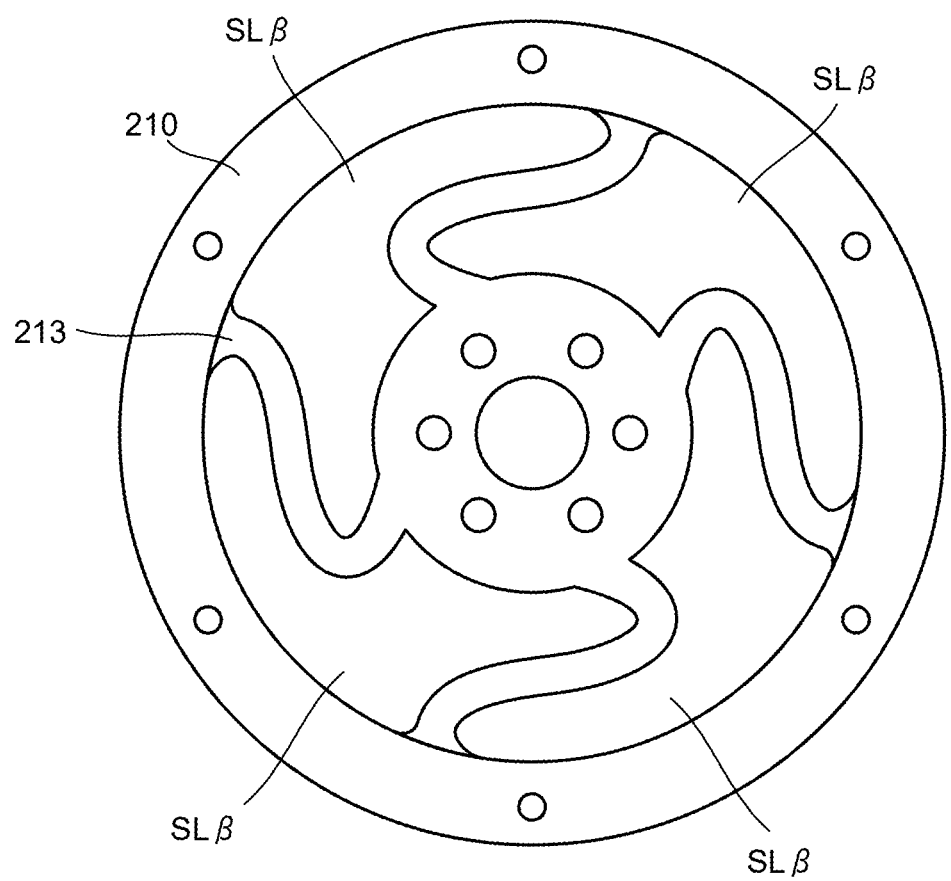
FIG. 9 is a diagram illustrating an exemplary configuration of a cutout portion according to a modification.

Furthermore, the resilient portion 213 may have a shape that is different from that of the cutout portion SL described in the above embodiment and those of the example illustrated in FIG. 8. FIG. 9 is a diagram illustrating an exemplary configuration of a cutout portion according to a modification. As illustrated in FIG. 9, the resilient portion 213 may include a plurality of cutout portions SLβ that is formed by processing part of a member constituting the flexure element 210.

<3-1-2. Variation (3) of Resilient Portion>

Furthermore, the resilient portion 213 is not limited to the example in which the resilient portion 213 is formed by processing the flexure element 210, and for example, may adopt a flat spiral spring at a position of the resilient portion 213 of the flexure element 210. This configuration may provide a further cost reduction effect upon mass production of the torque sensor 200.

<3-2. Cushioning Material>

Figure 10:
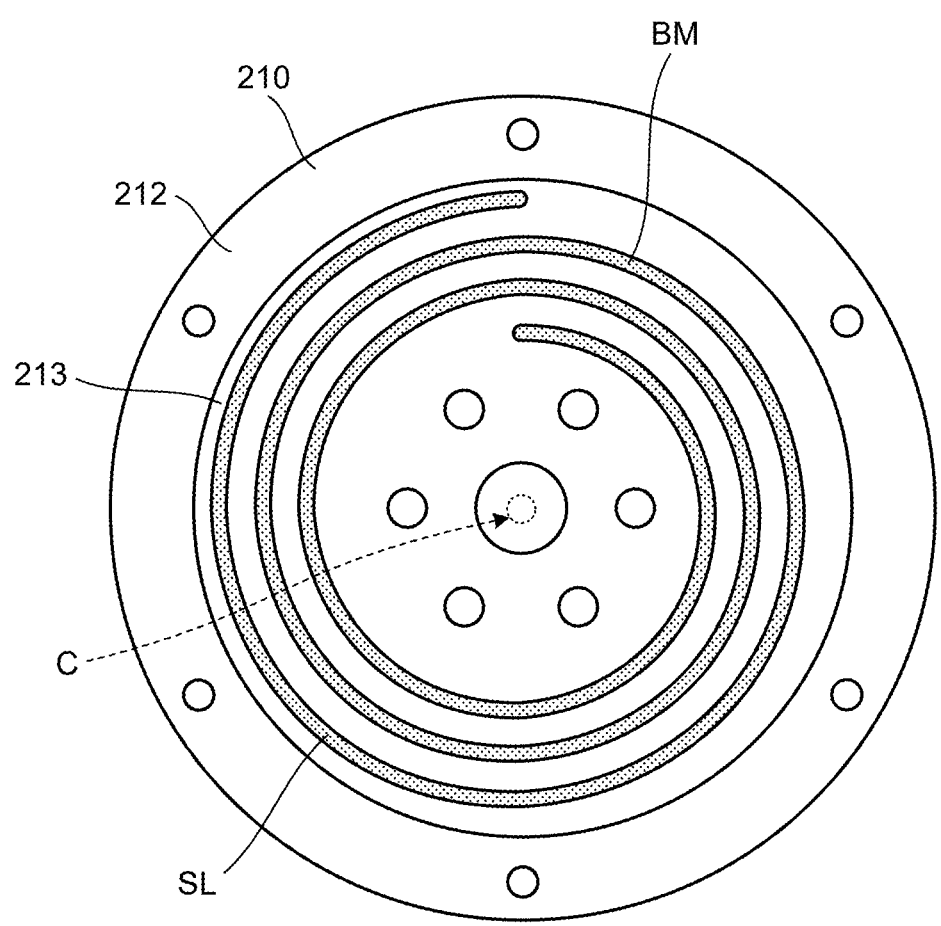
FIG. 10 is a diagram illustrating an example of insertion of a cushioning material according to a modification.

In the embodiments and the modifications described above, a cushioning material BM may be inserted into the cutout portion SL. FIG. 10 is a diagram illustrating an example of insertion of the cushioning material according to a modification. As illustrated in FIG. 10, the cushioning material BM is inserted over the entire circumference of the cutout portion SL of the resilient portion 13. For the cushioning material, silicone rubber, elastomer, or the like can be employed. Accordingly, a damper effect can be expected.

<3-3. Method of Coupling Output Side of Actuator>

Figure 11:
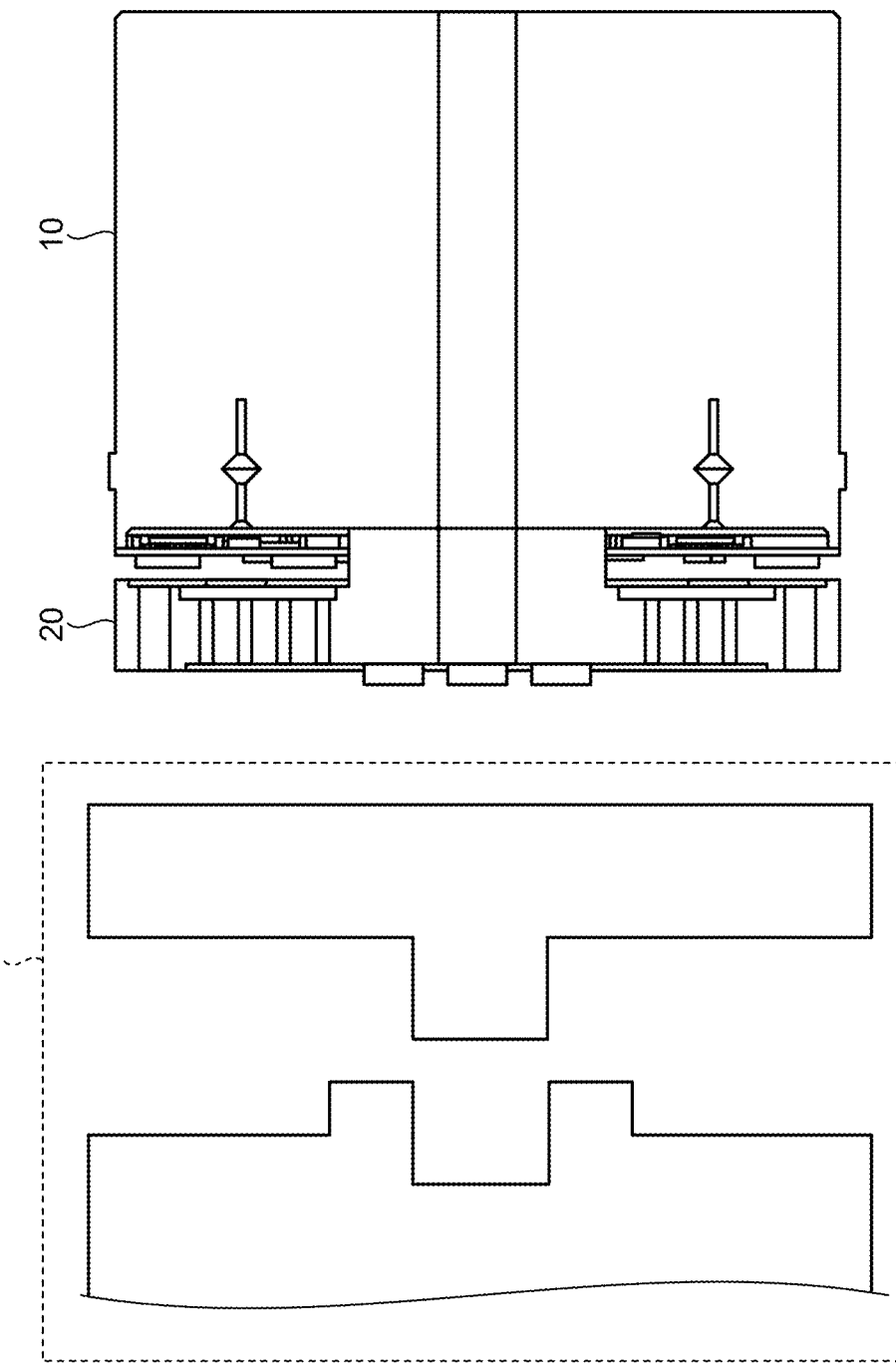
FIG. 11 is a diagram illustrating an example of a method of coupling an output unit according to a modification.

FIG. 11 is a diagram illustrating an example of a method of coupling the output unit according to a modification. As illustrated in FIG. 11, in the embodiments and modifications described above, the output side of the actuator 1 may be coupled to another member by using an Oldham coupling 30. This configuration makes it possible to accommodate a shift in the axial center that may be caused by the resilient portion 213 of the flexure element 210.

<3-4. Detection of Torque by Image Processing>

In the embodiments and the modifications described above, the torque sensor 200 may acquire an image obtained by capturing intervals between the cutout portions SL in the resilient portion 213 of the flexure element 210 to detect the torque from the acquired image. At this time, instead of the encoder disk 221 and the sensor unit 222, the torque sensor 200 preferably includes an imaging unit that is configured to image the intervals between the cutout portions SL provided in the resilient portion 213, and an image recognition unit that recognizes the image acquired by the imaging unit. The image recognition unit can be configured to use, for example, a trained model in which an image of the cutout portions SL is input and an estimation value of the torque applied to the actuator 1 (output unit 20) is output. The trained model can be generated by using any learning algorithm used for machine learning such as convolutional neural network (CNN).

4. Conclusion

The torque sensor 200 according to an embodiment of the present disclosure includes the sensor unit 222, the flexure element 210 that is the resilient body, and the detection unit 223. The sensor unit 222 detects, from the output unit 20 that is the rotational body of the actuator 1, the rotational position (e.g., the rotational position $P_1$) in the annular first area $A_1$ positioned at the first distance $d_1$ from the rotation center C, and the rotational position (e.g., the rotational position $P_2$) in the annular second area $A_2$ positioned at the second distance $d_2$ longer than the first distance $d_1$ from the rotation center C. The flexure element 210 that is the resilient body is provided between the first area A and the second area $A_2$. The detection unit 223 detects the torque applied to the output unit 20, on the basis of a result of the detection by the sensor unit 222.

Accordingly, the torque sensor 200 achieves cost reduction while securing the torque resolution of the sensor without using the strain gauge.

Furthermore, the sensor unit 222 of the torque sensor 200 includes the first sensor 222a that detects the rotational position (e.g., the rotational position $P_1$) in the first area $A_1$ and the second sensor 222b that detects the rotational position (e.g., the rotational position $P_2$) in the second area $A_2$. This configuration makes it possible to accurately detect the rotational position in the first area $A_1$ and the rotational position in the second area $A_2$.

Furthermore, the torque sensor 200 further includes the first encoder disk 221a that functions as the first position detection pattern provided in the first area $A_1$, and the second encoder disk 221b that functions as the second position detection pattern provided in the second area $A_2$. The first sensor 222a detects the first encoder disk 221a functioning as the first position detection pattern to detect the rotational position (e.g., the rotational position $P_1$) in the first area $A_1$. The second sensor 222b detects the second encoder disk 221b functioning as the second position detection pattern to detect the rotational position (e.g., the rotational position $P_2$) in the second area $A_2$. This configuration makes it possible to detect the rotational position in the first area A and the rotational position in the second area $A_2$, with a simple configuration.

Furthermore, the detection unit 223 of the torque sensor 200 detects the torque, on the basis of the phase difference between the rotational position $P_1$ in the first area $A_1$ and the rotational position $P_2$ in the second area $A_2$. This configuration makes it possible to secure the torque resolution.

Furthermore, the flexure element 210 of the torque sensor 200 that is the resilient body is formed by processing part of the member constituting the flexure element 210. This configuration makes it possible to reduce manufacturing cost of the flexure element 210 as much as possible.

Furthermore, the flexure element 210 of the torque sensor 200 that is the resilient body includes the curved cutout portion SL that extends in the circumferential direction (e.g., the directions indicated by the arrow dr) on the basis of the rotation center C of the actuator 1. This configuration makes it possible to cause the flexure element 210 to function as the resilient body.

Furthermore, the flexure element 210 of the torque sensor 200 that is the resilient body includes the cutout portion SLR and the cutout portion SLL that have different extending directions on the basis of the rotation center C, at positions where the cutout portions do not overlap each other. This configuration makes it possible to reduce a difference in torque gain between the clockwise direction (CW direction) and the counterclockwise direction (CCW direction).

Furthermore, the flexure element 210 of the torque sensor 200 that is the resilient body includes the cushioning material BM inserted into the cutout portion SL. Accordingly, a damper effect can be expected.

Furthermore, the flexure element 210 of the torque sensor 200 that is the resilient body may include a non-contact type flat spiral spring. This configuration may provide a further cost reduction effect upon mass production of the torque sensor 200, as compared with the laser processing for forming the cutout portion SL.

Furthermore, the torque sensor 200 may be configured so that the output side of the actuator 1 is coupled to another member by using the Oldham coupling 30. This configuration makes it possible to accommodate a shift in the axial center that may be caused by the resilient portion 213 of the flexure element 210.

The embodiments and modifications of the present disclosure have been described above, but the technical scope of the present disclosure is not limited to the embodiments and modifications described above, and various modifications and alterations can be made without departing from the spirit and scope of the present disclosure. Moreover, the component elements of different embodiments and modifications may be suitably combined with each other.

Furthermore, the effects descried herein are merely illustrative or exemplified effects, and are not limitative. In other words, with or in the place of the above effects, the technology of the present disclosure may achieve other effects that are clear to those skilled in the art from the description of this specification.

It is should be noted that the technology of the present disclosure naturally comes under the technical scope of the present disclosure, and the present technology may also be configured as below.

(1)
A torque sensor comprising:
a sensor unit that detects, from an output unit that is a rotational body of an actuator, a rotational position in an annular first area positioned at a first distance from a rotation center, and a rotational position in an annular second area positioned at a second distance longer than the first distance from the rotation center;
a resilient body that is provided between the first area and the second area; and
a detection unit that detects a torque applied to the output unit based on a result of the detection by the sensor unit.

(2)
The torque sensor according to (1), wherein
the sensor unit includes
a first sensor that detects the rotational position in the first area, and a second sensor that detects the rotational position in the second area.

(3)
The torque sensor according to (2), further comprising:
a first position detection pattern that is provided in the first area; and
a second position detection pattern that is provided in the second area;
wherein the first sensor
detects the first position detection pattern to detect the rotational position in the first area, and
the second sensor
detects the second position detection pattern to detect the rotational position in the second area.

(4)
The torque sensor according to (1), wherein
the detection unit
detects the torque, based on a phase difference between the rotational position in the first area and the rotational position in the second area.

(5)
The torque sensor according to claim 1, wherein
the resilient body
is formed by processing part of a member constituting the resilient body.

(6)
The torque sensor according to (5), wherein
the resilient body
includes a curved cutout portion that extends in a circumferential direction based on the rotation center.

(7)
The torque sensor according to (6), wherein
the resilient body
includes a plurality of the cutout portions that has different extending directions based on the rotation center, at positions where the cutout portions do not overlap each other.

(8)
The torque sensor according to (6), wherein
the resilient body
includes a cushioning material that is inserted into the cutout portion.

(9)
The torque sensor according to (1), wherein
the resilient body
includes a non-contact type flat spiral spring.

(10)
The torque sensor according to (1), wherein
the actuator has an output side that is coupled to another member by using an Oldham coupling.

REFERENCE SIGNS LIST

1 ACTUATOR
10 MOTOR UNIT
20 OUTPUT UNIT
30 COUPLING
200 TORQUE SENSOR
210 FLEXURE ELEMENT
211 FIRST OUTPUT UNIT
212 SECOND OUTPUT UNIT
213 RESILIENT PORTION
220 FUNCTIONAL UNIT
221 ENCODER DISK
221a FIRST ENCODER DISK
221b SECOND ENCODER DISK
222 SENSOR UNIT
222a FIRST SENSOR
222b SECOND SENSOR
223 DETECTION UNIT

The invention claimed is:

1. A torque sensor for an actuator comprising:
a flexure element that includes
a first annular area positioned at a first distance from a rotation center of a rotational body of the actuator,
a second annular area positioned at a second distance that is longer than the first distance from the rotation center of the rotational body of the actuator, and
a resilient body provided at least between the first annular area and the second annular area, and
circuitry configured to
detect a rotational position of the first annular area and a rotational position of the second annular area, and
detect a torque applied to the rotational body of the actuator based on the rotational position of the first annular area and the rotational position of the second annular area that were detected, wherein the resilient body includes a spiral cutout portion that extends in a circumferential direction around the rotation center of the rotational body and forms a spiral spring portion of the resilient body.

2. The torque sensor according to claim 1, further comprising:
a first sensor that detects the rotational position of the first annular area, and
a second sensor that detects the rotational position of the second annular area.

3. The torque sensor according to claim 2, further comprising:
a first position detection pattern that is provided in the first annular area; and
a second position detection pattern that is provided in the second annular area, wherein
the first sensor detects the first position detection pattern to detect the rotational position of the first annular area, and
the second sensor detects the second position detection pattern to detect the rotational position of the second annular area.

4. The torque sensor according to claim 1, wherein
the circuitry is further configured to detect the torque, based on a phase difference between the rotational position of the first annular area and the rotational position of the second annular area.

5. The torque sensor according to claim 1, wherein
the resilient body includes an additional spiral cutout portion that extends in a circumferential direction around the rotation center of the rotational body and forms an additional spiral spring portion of the resilient body, positions of the spiral cutout portion and the additional spiral cutout portion not overlapping each other.

6. The torque sensor according to claim 1, wherein
the resilient body includes a cushioning material that is inserted into the spiral cutout portion.

7. The torque sensor according to claim 1, wherein
the rotational body of the actuator has an output side that is coupled to another member to be rotated by the actuator by using an Oldham coupling.

* * * * *